United States Patent [19]

Bahoshy et al.

[11] 4,139,639

[45] Feb. 13, 1979

[54] FIXATION OF APM IN CHEWING GUM

[75] Inventors: Bernard J. Bahoshy, Mahopac; Robert E. Klose, West Nyack, both of N.Y.

[73] Assignee: General Foods Corporation, White Plains, N.Y.

[21] Appl. No.: 847,390

[22] Filed: Oct. 28, 1977

Related U.S. Application Data

[63] Continuation of Ser. No. 761,836, Jan. 24, 1977, abandoned.

[51] Int. Cl.$^2$ .............................................. A23G 3/30
[52] U.S. Cl. ........................................ 426/3; 426/548
[58] Field of Search ...................................... 426/3–6, 426/548

[56] References Cited

U.S. PATENT DOCUMENTS

| | | | |
|---|---|---|---|
| 3,795,744 | 3/1974 | Ogawa et al. | 426/3 |
| 3,826,847 | 7/1974 | Ogawa et al. | 426/3 |
| 3,928,633 | 12/1975 | Shoaf et al. | 426/548 |
| 3,930,626 | 12/1975 | Clark | 426/3 |
| 3,943,258 | 3/1976 | Bahosky | 426/3 |

*Primary Examiner*—Jeanette M. Hunter
*Attorney, Agent, or Firm*—Richard Kornutik

[57] ABSTRACT

This invention relates to a product and process in which L-aspartyl-L-phenylalanine methyl ester is fixed in gum Arabic and/or the reaction product of a compound containing a polyvalent metallic ion, with an ungelatinized starch acid-ester of a substituted dicarboxylic acid whereby the decomposition rate of the L-aspartyl-L-phenylalanine methyl ester when employed in a chewing gum system is greatly reduced.

14 Claims, No Drawings

FIXATION OF APM IN CHEWING GUM

This is a continuation of application Ser. No. 761,836, filed Jan. 24, 1977, now abandoned.

BACKGROUND OF THE INVENTION

Chewing gums are generally comprised of a substantially water insoluble, chewable gum base such as chicle, it substitutes mixtures thereof and the like. Incorporated within this gum base may be plasticizers or softeners to improve the consistency and texture of the gum flavors and sweetening agents such as sugar or corn syrup, or for sugarless gums artificial sweeteners.

L-aspartyl-L-phenylalanine methyl ester (APM) is a dipeptide sweetening agent described in U.S. Pat. No. 3,492,131 and is a desirable chewing gum sweetening agent. Another attribute of APM is that it may be added in effective amounts to a normally sweetened sugar or sugarless chewing gum to produce longer lasting sweetness and flavor as disclosed in U.S. Pat. Nos. 3,943,258 and 3,982,023, which are herein incorporated by reference.

In the normal course of manufacture, shipment and storage of chewing gums, the product is often exposed to relatively high temperatures; i.e., 70° F. to 100° F. plus, for extended periods of time. The stability of APM is temperature sensitive. High temperatures induce the ester linkage to hydrolyze to the dipeptide aspartylphenylalanine. This dipeptide can then cyclize to the corresponding diketopiperazine. When this transition takes place, the sweetness of the APM is proportionately lessened. Thus, the effectiveness of APM in a chewing gum composition is greatly reduced when the gum is subjected to high thermal storage conditions. Therefore, it would be highly desirable if a simple system were devised whereby the decomposition of APM in chewing gum when stored at elevated temperatures could be greatly reduced.

SUMMARY OF THE INVENTION

This invention relates to a sweetened chewing gum composition which comprises gum base, flavor, a bulking agent and L-aspartyl-L-phenylalanine methyl ester (APM) wherein the APM is fixed in an encapsulating agent selected from the group consisting of gum Arabic and a dextrin which is the reaction product of a compound containing a polyvalent metallic ion, with specified ungelatinized starch acid-esters of substituted dicarboxylic acids. APM is useful in chewing gum as a sweetener and as a sweetness and flavor extender.

It is the object of this invention to substantially increase the storage stability of APM when it is combined in the chewing gum confection. Heretofore chewing gum containing APM has been found to lose in excess of 70% of its sweetening potency when stored at 100° F./30% rh for 20 weeks. The product of the instant invention contains APM which is fixed in gum Arabic and/or dextrin. This fixation or encapsulation greatly reduces the amount of decomposition of APM in the gum system.

DETAILED DESCRIPTION OF THE INVENTION

L-aspartyl-L-phenylalanine methyl ester (APM) is a relatively recent development in food technology. It is commercially available from G. D. Searle & Company, Skokie, Illinois, under the trademark name EQUA 200. It is a sugar substitute with a sweetening potency approximately two hundred times that of sucrose.

| TYPICAL ANALYSIS FOR FOOD GRADE EQUA 200 | |
|---|---|
| Identity | |
| A. Appearance: | White Crystalline powder |
| B. Odor: | Almost odorless (very slight acetic odor) |
| C. Taste (0.07% in water): | Clean, sweet taste, free of significant bitter, sour, or salty off-notes |
| D. Chemical identity tests | |
| 1. Amino Acid: | Positive |
| 2. Ester: | Positive |
| E. Specific rotation in 15N formic acid: | +15.91 |
| F. pH of the 0.8% solution: | 5.32 |
| Assay | |
| Titration by Lithium Methoxide: | 99.9% |
| Purity | |
| A. Clarity and color of solution (0.8% solution): | Clear and colorless, no suspended particles |
| B. Transmission of solution (1% in 2N HCl): | 99% at 430 nm |
| C. Loss on drying (105° C/4 hours): | 3.9% |
| D. Residue on ignition: | 0.04 |
| E. Heavy metal: | 5 ppm |
| F. Arsenic: | 0.1 ppm |
| G. Diketopiperazine: | 0.5% |
| Microbiological | |
| A. *E. coli* | Negative |
| B. *Salmonella* | Negative |
| C. Coagulase + Staph | Negative |

L-aspartyl-L-phenylalanine methyl ester is a highly desirable replacement for sugar or sucrose in such comestibles as breakfast cereals, dry bases for beverages, gelatin foods, fillings and dairy product analogue toppings. However, APM contains an ester linkage that under certain moisture, temperature and pH conditions a hydrolyze to the dipeptide aspartylphenylalanine. The dipeptide can then cyclize to the corresponding diketopiperazine (DKP).

A potential for APM to go spontaneously to DKP results in a proportional loss of product sweetness. Thus products which are subjected to extreme heat such as baking are incompatible with APM. Further, the products which do incorporate APM will have substantially diminished sweetening potency when adverse conditions such as elevated storage temperatures are encountered.

A chewing gum system is particularly enhanced by incorporating APM within it. As a basic sugar substitute, as disclosed in U.S. Pat. No. 3,642,491, a sugarless chewing gum may be obtained which has a clean sugarlike sweetness and in which no synthetic flavor or aftertaste is perceived. U.S. Pat. No. 3,943,258 teaches that the addition of APM to sugar and sugarless chewing gum compositions in effective amounts extends a time period over which both flavor and sweetness are discernible during chewing. According to the practice of the instant invention, the APM may be used as the sole sweetener in a chewing gum composition or added to a sweetened chewing gum as an enhancer or extender.

The gum base may be any chewable, substantially water insoluble base such as chicle and substitutes thereof, guttagkay, sorva, jelutong, synthetic polymers such as polyvinyl acetate, synthetic resins, rubbers, and the like and mixtures of these materials. The amount of gum base employed may vary widely depending on the type base used and other ingredients making up the final gum product and other like factors. Generally, however, it has been found that anywhere from 15 to 40% by weight of the final gum composition may be used and preferably from about 20 to about 30%. Plasticizers or softeners such as lanolin, propylene glycol, glycerol and the like and mixtures thereof may optionally be incorporated within the gum base to achieve a desired texture and consistency. Generally, the flavors employed in chewing gums may be the essential oils or synthetic flavors or mixtures of these. Flavors such as wintergreen, spearmint, peppermint, birch, anise, fruit flavors, and the like may be used satisfactorily with the variety of gum bases. The amount of flavoring material is normally a matter of preference, but may be subject to the consideration of such factors as type of flavor used and the type of base used and the like. Generally, flavoring materials account for about 1% by weight of the total gum composition.

In order to obtain a sweetened gum, the remaining portion of the gum composition is generally a sweetener such as sugar or for sugarless gums a sugar substitute. By sugar we mean sucrose, dextrose, corn syrup solids (their substitutes) and the like and mixtures thereof. Sugar substitutes may be any sweetening agent used in sugarless gum such as mannitol, sorbitol, xylitol, saccharin, cyclamate, dihydrochalcone and dipeptides, particularly L-aspartyl-L-phenylalanine methyl ester. Sugar and sugar alcohols may also be defined as bulking agents and generally comprise a major amount by weight of the total gum composition. Additionally, non-sweet bulking agents such as hydrolyzed cereal solids may be included in the gum composition.

The basic concept of the instant invention resides in fixing or encapsulating the APM in order to retard and/or prevent the conversion of APM to DKP under certain moisture, temperature and pH conditions which affect a chewing gum system. It has been found that APM may be successfully fixed in gum Arabic and a particular dextrin which is commercially available under the registered trademark name Capsul ® as manufactured by National Starch and Chemical Corporation, New York, New York.

Physical Properties

Color — White to off-white
Form — Powder
pH — 3 (approx.)
Moisture — 5% (approx.)

Capsul ® dextrin, as disclosed in U.S. Pat. No. 3,091,567, is a reaction product of a compound containing a polyvalent metallic ion, with an ungelatinized starch acid-ester of a substituted dicarboxylic acid. Such starch acid-esters may be represented diagrammatically by the following formula:

where R is a radical selected from the class consisting of dimethylene and trimethylene radicals, and $R_1$ is a hydrocarbon constituent selected from the class consisting of alkyl, alkenyl, aralkyl or aralkenyl groups. The above-described ungelatinized starch acid-esters are prepared by reacting an ungelatinized starch, in an alkaline medium, with a substituted cyclic dicarboxylic acid anhydride having the following formula:

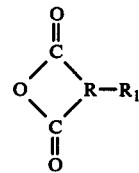

where R and $R_1$ represent the same substituent groups as are listed above for those same symbols. Substituted cyclic dicarboxylic anhydrides falling within this formula are the substituted succinic and glutaric acid anhydrides.

In the preferred embodiment of this invention, the APM fixation is accomplished by spray drying prior to incorporating it into the chewing gum. Other methods such as coacervation may be employed. The spray drying process comprises forming an emulsion of APM and the gum Arabic or dextrin in a continuous aqueous solution. The emulsion is then passed through a spray nozzle and broken up into numerous droplets. The droplets are introduced into a drying environment and as their moisture is given up the droplets are formed into solid particles. The APM now exists as part of the solid matrix which is to be incorporated in a chewing gum formulation.

In the preferred embodiment of the instant invention, an aqueous solution of APM and an encapsulating agent are passed through a positive displacement homogenizer at pressures between 250 psi and 5000 psi and preferably 1500 psi to 2500 psi so that the components are thoroughly mixed and/or emulsified. Next, it is most preferable to introduce the product stream into the body of the spray dryer via a rotating disc-type nozzle. The product stream contacts the disc which may be rotated by separate means or by the pressure of the product stream and thereby the product stream is dispersed into numerous droplets within the spray dryer. The rotating disc allows a more uniform product distribution of the material to be spray dried within the tower.

The temperatures employed in the drying process are typically in an air temperature range of 350° F. to 550° F. on the inlet side and 175° F. to 300° F. on the outlet side. Preferably the inlet temperature is between 375° F. and 425° F. and the outlet temperature is between 200° F. and 250° F. The temperature of the solution entering the dryer is preferably between 60° F. and 120° F. and most preferably between 70° F. and 90° F. The dispersion wheel or rotating disc may operate between about 200 rpm and 1000 rpm and preferably between 550 rpm and 850 rpm. The concentration of solids entering the dryer may be between 10% to 45% solids by weight. Preferably the total solids concentration will be between 20% and 30% by weight.

The ratio of encapsulating agent to APM may vary between about 10:1 to about 2:1 and most preferably will be between 5:1 to 3:1. The ratio of encapsulating agent to APM of the final product will be the same as the ratios comprising the inlet stream since substantially all of the water is removed during drying.

EXAMPLE I

Peppermint Flavor Chewing Gum
Sucrose/Dextrose Formulation - %

| Ingredient | Control-Free APM | APM in Gum Arabic | APM in Capsul |
|---|---|---|---|
| Chewing Gum Base | 24.000 | 24.000 | 24.000 |
| Sugar, 6 × | 29.197 | 28.097 | 28.097 |
| Dextrose Monohydrate | 29.000 | 27.500 | 27.500 |
| Corn Syrup, 45.5° Baume | 15.000 | 15.000 | 15.000 |
| Glycerol | 0.800 | 0.800 | 0.800 |
| Lecithin | 0.200 | 0.200 | 0.200 |
| APM | 0.650 | | |
| Peppermint Oil + Enhancer | 1.153 | 1.153 | 1.153 |
| 20% APM Fixed in Gum Arabic | | 3.250 | |
| 20% APM Fixed in Capsul ® Dextrin | | | 3.250 |
| | 100.000 | 100.000 | 100.000 |

Co-Drying of APM

Dryer diameter: 12 feet
Total height: 30 feet
Vertical drying height: 14 feet (which is the distance between the nozzle and the top of the cone-shaped lower section of the spray dryer).

Gum Arabic

A solution comprising 240 pounds of gum Arabic, 60 pounds of APM and 110 gallons of water is prepared. The solution is passed through a Mantin-Gaulin positive displacement homogenizer at an operating pressure of 2000 psi. The product stream is fed to the spray dryer via a rotating disc nozzle. The disc is rotated at 800 rpm. The average inlet temperature is 410° F. and the outlet temperature is 215° F. Feed temperature of the solution is 78° F.

Capsul ®

The Capsul ® is co-dried under the same conditions as the Gum Arabic.

Preparation of Sugar APM Chewing Gum

2000 Gram Batch in 1 Gallon Sigma Mixer

1. Soften gum base in a steam-jacketed sigma-blade mixer at 120°-130° F. for five minutes.
2. Add the glycerine and lecithin and mix five minutes.
3. Add corn syrup, mix five minutes.
4. Add ½ the sucrose/dextrose mixture, mix thoroughly.
5. Add remaining sucrose/dextrose blended with APM or fixed APM, mix thoroughly.
6. Add flavor, mix for two minutes.
7. Pass the gum through sheeting rolls at approximately 100° F., to a thickness of 0.068-0.075".
8. Temper the sheets at 70° F./45% RH for 24 hours, score into sticks and package.

Effect of Fixation on APM Stability
Sucrose/Dextrose Peppermint formulations

| | Sample | % APM Loss at 100° F. | | | |
|---|---|---|---|---|---|
| # | Description | 4 wks | 9wks | 17wks | 20wks |
| 1 | Control-Free APM | 23 | 38 | — | 73 |
| 2 | APM fixed in Gum Arabic | 5 | 12 | — | 40 |
| 3 | APM fixed in Capsul ® dextrin | 0 | 16 | — | 50 |

EXAMPLE II

Peppermint Flavor Chewing Gum
Sugarless Formulations - %

| Ingredient | Control Free APM | APM in Gum Arabic | APM in Capsul Dextrin |
|---|---|---|---|
| Chewing Gum base | 27.000 | 27.000 | 27.000 |
| Sorbitol | 47.174 | 44.574 | 44.574 |
| Sorbo Solution (70%) | 17.300 | 17.300 | 17.300 |
| Mannitol | 6.100 | 6.100 | 6.100 |
| Glycerol | 0.500 | 0.500 | 0.500 |
| Peppermint Oil + Enhancer | 1.276 | 1.276 | 1.276 |
| APM | 0.650 | | |
| 20% APM in Gum Arabic | — | 3.250 | — |
| 20% APM in Capsul ® Dextrin | | | 3.250 |
| | 100.000 | 100.000 | 100.000 |

Co-drying of Gum Arabic and Capsul ® same as Example I.

Sugarless APM Chewing Gum Process

Procedure for 1,750 Gram Batch In 1 Gallon Sigma Mixer

1. Preheat mixer to 150° F. with mixture of steam and water. It may be necessary to soften base in mixer, or before adding to mixer, to get proper mixing.
2. Add base and glycerol, mix 5-10 minutes.
3. Add ½ of sorbitol and mannitol, blend for 5-10 minutes.
4. Add sorbo solution and mix until uniform (approx. 5 minutes).
5. Preblend APM or fixed APM and remaining sorbitol and mannitol, and add to mixer. Shut off steam, allow cold water to circulate in jacket. Mix 5 minutes.
6. Check mix for grainyness. If grainy, mix for additional 5-10 minutes.
7. Add flavor, mix 2-3 minutes.
8. Remove from mixer, pass the gum through sheeting rolls at approximately 100° F. to a thickness of 0.68-0.075.
9. Temper the sheets at 70° F./45% RH for 24 hours, score into sticks and package.

Effect of Fixation on APM Stability
Sugarless Peppermint Formulations

| | Sample | % APM Loss at 100° F. | | |
|---|---|---|---|---|
| # | Description | 4wks | 9wks | 20wks |
| 4 | Control-Free APM | 22 | 33 | 64 |
| 5 | APM Fixed in Gum Arabic | 17 | 22 | 43 |
| 6 | APM Fixed in Capsul ® dextrin | 21 | 32 | 54 |

What is claimed is:

1. A chewing gum composition which comprises gum base, flavor, a bulking agent and L-aspartyl-L-phenylalanine methyl ester wherein the L-aspartyl-L-phenylalanine methyl ester is fixed in an encapsulating agent composition and the ratio of encapsulating agent composition to L-aspartyl-L-phenylalanine methyl ester is between about 10:1 to about 2:1 and the encapsulating agent composition consists of gum arabic and the reaction product of a compound containing a polyvalent metallic ion, with an ungelatinized starch acid-ester of a substituted dicarboxylic acid, such starch acid-esters represented diagrammatically by the following formula:

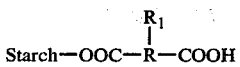

where R is a radical selected from the class consisting of dimethylene and trimethylene radicals, and $R_1$ is a hydrocarbon constituent selected from the class consisting of alkyl, alkenyl, aralkyl or aralkenyl groups, the above-described ungelatinized starch acid-esters are prepared by reacting an ungelatinized starch, in an alkaline medium, with a substituted cyclic dicarboxylic acid anhydride having the following formula:

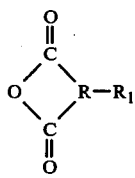

where R and $R_1$ represent the same substituent groups as are listed above for those same symbols, substituted cyclic dicarboxylic anhydrides falling within this formula are the substituted succinic and glutaric acid anhydrides whereby the conversion of L-aspartyl-L-phenylalanine methyl ester to diketopiperazine is greatly reduced.

2. The composition of claim 1 wherein the bulking agent is sugar.

3. The composition of claim 1 wherein the bulking agent comprises a sugar alcohol selected from the group consisting of sorbitol, mannitol, xylitol and mixtures thereof.

4. The composition of claim 3 wherein the L-aspartyl-L-phenylalanine methyl ester is fixed by co-drying an aqueous solution of L-aspartyl-L-phenylalanine methyl ester with an aqueous solution of an encapsulating agent composition consisting of gum arabic and the reaction product of a compound containing a polyvalent metallic ion, with an ungelatinized starch acid-ester of a substituted dicarboxylic acid, such starch acid-esters represented diagrammatically by the following formula:

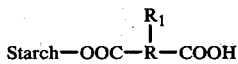

where R is a radical selected from the class consisting of dimethylene and trimethylene radicals, and $R_1$ is a hydrocarbon constituent selected from the class consisting of alkyl, alkenyl, aralkyl or aralkenyl groups, the above-described ungelatinized starch acid-esters are prepared by reacting an ungelatinized starch, in an alkaline medium, with a substituted cyclic dicarboxylic acid anhydride having the following formula:

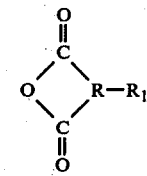

where R and $R_1$ represent the same substituent groups as are listed above for those same symbols, substituted cyclic dicarboxylic anhydrides falling within this formula are the substituted succinic and glutaric acid anhydrides.

5. The composition of claim 4 wherein the drying method employed is spray drying.

6. The composition of claim 5 wherein the aqueous solution enters the spray dryer via a rotating disc nozzle.

7. The composition of claim 1 wherein the ratio of L-aspartyl-L-phenylalanine methyl ester to the co-drying ingredients is between about 5:1 to about 3:1.

8. A chewing gum composition which comprises gum base, flavor, a bulking agent and L-aspartyl-L-phenylalanine methyl ester wherein the L-aspartyl-L-phenylalanine methyl ester is fixed in the encapsulating agent gum arabic and the ratio of gum arabic to L-aspartyl-L-phenylalanine methyl ester is between about 10:1 to about 2:1 whereby the conversion of L-aspartyl-L-phenylalanine methyl ester to diketopiperazine is greatly reduced.

9. The composition of claim 8 wherein the bulking agent is sugar.

10. The composition of claim 9 wherein the bulking agent comprises a sugar alcohol selected from the group consisting of sorbitol, mannitol, xylitol and mixtures thereof.

11. The composition of claim 10 wherein the laspartyl-L-phenylalanine methyl ester is fixed by co-drying an aqueous solution of L-aspartyl-L-phenylalanine methyl ester with an aqueous solution of the encapsulating agent gum Arabic.

12. The composition of claim 11 wherein the drying method employed is spray drying.

13. The composition of claim 12 wherein the aqueous solution enters the spray dryer via a rotating disc nozzle.

14. The composition of claim 8 wherein the ratio of L-aspartyl-L-phenylalanine methyl ester to the co-drying ingredients is between about 5:1 to about 3:1.

* * * * *

UNITED STATES PATENT AND TRADEMARK OFFICE
CERTIFICATE OF CORRECTION

PATENT NO. : 4,139,639
DATED : February 13, 1979
INVENTOR(S) : Bernard J. Bahoshy, Robert E. Klose It is certified that error appears in the above-identified patent and that said Letters Patent are hereby corrected as shown below:

On the cover page, after "[73] Assignee ... N.Y." insert as the next paragraph
-- [*] Notice: The portion of the term of this patent subsequent to Oct. 24, 1995, has been disclaimed. --

On the cover page, after "[63] Continuation ... 1977," cancel "abandoned" and insert -- now U.S. Patent No. 4,122,195. --

On the cover page in References Cited, correct spelling of Bahoshy.

In column 1, line 3, cancel "now abandoned" and insert -- Now U.S. Patent No. 4,122,195 --

Signed and Sealed this

Thirteenth Day of November 1979

[SEAL]

Attest:

RUTH C. MASON
Attesting Officer

LUTRELLE F. PARKER
Acting Commissioner of Patents and Trademarks